Patented Dec. 7, 1948

2,455,722

UNITED STATES PATENT OFFICE 2,455,722

METHOD FOR PRODUCTION OF POLYMERIC BETA,GAMMA-OLEFINIC ALCOHOLS

David E. Adelson and Harold F. Gray, Jr., Berkeley, Calif., assignors to Shell Development Company, San Francisco, Calif., a corporation of Delaware No Drawing. Application December 8, 1945, Serial No. 633,880

9 Claims. (Cl. 260—80)

This invention relates to a method for the production of polymeric beta,gamma-olefinic alcohols. More particularly, the invention pertains to a method for producing polymeric beta,gamma-olefinic alcohols, such as polyallyl alcohol, by hydrolyzing the polymer of an acetal of the beta,-gamma-olefinic alcohol.

Beta,gamma-olefinic alcohols, such as allyl alcohol, can be polymerized directly to give polymers but the polymerization is difficult and requires special techniques. When an oxygen-yielding catalyst such as an organic peroxide or air is used to assist the polymerization, the free hydroxy group of the alcohol is attacked to some extent by the catalyst during the polymerization. The result of this attack is that some of the free hydroxy groups in the polymeric alcohol are converted to aldehyde, acid and/or ester groups. If the free hydroxy group of the monomeric beta,-gamma-olefinic alcohol is protected by reaction with an aldehyde to form an acetal and the formed acetal is polymerized, hydrolysis of the polymeric acetal gives the polymeric alcohol with the hydroxy groups thereof in an unchanged condition.

The beta,gamma-olefinic alcohols or allyl-type alcohols are a distinct class of unsaturated alcohols consisting of allyl alcohol and related alcohols which have an olefinic double-bonded aliphatic linkage between the carbon atoms which are in the beta and gamma positions with respect to the carbinol group of the alcohol. In other words, the unsaturated alcohols with which this invention is concerned contain 3 to 9 carbon atoms and have an olefinic linkage between two carbon atoms, one of which is directly linked to the saturated carbon atom having the hydroxy group of the alcohol directly linked thereto. Preferably at least one of the olefinic unsaturated carbon atoms has at least one hydrogen atom directly linked to it. These beta,gamma-olefinic monohydric alcohols can either be primary, secondary or tertiary alcohols and they contain in the molecule a structure which can be represented by the general formula.

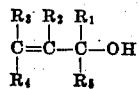

wherein each R represents a substituent such as hydrogen or an organic radical, which latter is preferably a lower hydrocarbon radical like methyl, ethyl, propyl, allyl, methallyl, cyclopentyl, cyclohexyl, phenyl, cresyl, etc., and $R_2$, $R_3$ and $R_4$ can also be a halogen atom. Preferred beta,-gamma-olefinic alcohols contain in the molecule a terminal methylene group attached by an olefinic double bond to a carbon atom which is directly attached to a saturated carbinol carbon atom as represented by the general formula

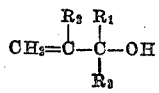

wherein each R represents a substituent such as hydrogen or an organic radical, which latter is preferably a lower hydrocarbon radical, and $R_2$ can also be a halogen atom. More particularly, preferred unsaturated alcohols are those wherein the carbinol carbon atom is primary or secondary in character as represented by the formula

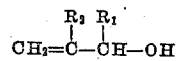

wherein each R represents a substituent such as hydrogen or an organic radical, which latter is preferably a lower hydrocarbon radical, and $R_2$ can also be a halogen atom.

Examples of beta,gamma-olefinic alcohols are allyl alcohol, methallyl alcohol, ethallyl alcohol, beta-chlorallyl alcohol, gamma-chlorallyl alcohol, 3-hydroxy-butene-1, 3-hydroxy-pentene-1, 3-hydroxy-isopentene-1, 3-hydroxy-3-methylbutene-1, 3-hydroxy-2-methylpentene-1, 3-hydroxy-2-ethylbutene-1, 3-hydroxy-2,3-dimethylbutene-1, 3-hydroxy-pentadiene-1,4, and 3-hydroxyhexene-1-yne-5. Other unsaturated alcohols of the class include crotyl alcohol, tiglyl alcohol, 3-chlorobutene-2-ol-1, cinnamyl alcohol, 1-hydroxy-hexadiene-2,4, 1-hydroxy-butadiene-2,3, 1-hydroxy-2-methylhexene-2, 2-cyclohexenol, 2-cyclopentenol, etc. These examples of the unsaturated alcohols contain 3 to 9 carbon atoms.

The monomeric acetals are prepared by reacting the beta,gamma-olefinic alcohol with an aldehyde. In our copending application Serial No. 503,160, filed September 10, 1943, methods are described for preparing acetals of the beta,gamma-olefinic alcohols. The aldehyde is a saturated aliphatic mono-aldehyde of 1 to 6 carbon atoms such as formaldehyde, acetaldehyde, propionaldehyde, butyraldehyde, isobutyraldehyde, valeraldehyde, isovaleraldehyde, or hexanal. The polymers of the acetals are employed in the process of the invention.

Preferred polymers for use in the invention are those from beta,gamma-olefinic alkenyl formals, acetals, propionals, n-butyrals, and isobutyrals. Such acetals in monomeric form are derived from beta,gamma-alkenols or an alken-2-ol-1 of 3 to 7 carbon atoms and includes such typical compounds as diallyl formal, diallyl butyral, and dimethallyl formal, polymers of which compounds are the most preferred reactants for use in the process of the invention.

The polymers of the acetals of the beta,gamma-olefinic alcohols can exist in several more or less distinct polymeric states. The monomeric acetals contains two polymerizable unsaturated groups and by effecting polymerization through these groups, the polymer obtained is varied from a soluble and fusible polymer to an insoluble and infusible polymer. The polymerization of the compounds progresses through the following stages: monomer, soluble and fusible polymer (usually viscous liquid), insoluble and fusible polymer (gel) and insoluble and infusible polymer (a hard resin). In this application the term "polymeric," as used in connection with polymeric acetals and polymeric alcohols, refers to polymers which contain a plurality of monomeric units in the polymeric molecule by bonding through the olefinic linkages of the monomeric material. The polymeric acetals are "addition" polymers of the monomeric acetals.

The monomeric acetals are converted to polymers either by the use of heat or of heat in conjunction with an oxygen-yielding polymerization catalyst. The use of heat alone requires a temperature above about 150° C. but below that temperature at which degradation and decomposition of the acetal occurs. A temperature of 200° C. to 300° C. is preferred. When an oxygen-yielding catalyst is employed, lower temperatures can be used to effect the polymerization. The polymerization catalyst may be either a peroxide compound like benzoyl peroxide, hydrogen peroxide, barium peroxide, sodium peroxide, tetralin peroxide, olefin peroxides, acetal peroxide, acetone peroxide, tertiary butyl hydroperoxide, ditertiary butyl peroxide, and the like, as well as other oxygen-yielding compounds such as an alkali metal peroxide or persulfate. It is ordinarily preferred that the catalyst be a molecular oxygen-containing gas such as air, pure oxygen or oxygen in admixture with inert gases like nitrogen, hydrogen, helium, carbon dioxide, ethane, etc. The polymerization using an oxygen-yielding catalyst is effected preferably at a temperature above 100° C. but below the temperature at which appreciable decomposition occurs. A most preferred range within which the polymerization is effected with an oxygen-yielding catalyst is between 100° C. and 200° C. In those cases in which the temperature of operation is above the normal boiling point of the monomeric material, it is necessary to employ superatmospheric pressure to maintain at least part of the material in the liquid phase.

When using a molecular oxygen-containing gas as catalyst, the gas is passed through the liquid material in a finely dispersed state so as to have intimate contact with the liquid. The exit gas contains some evaporated material and it is preferable to recover this by condensation and return it to the reaction vessel by well-known methods.

The peroxide compounds are not particularly stable at temperatures above 100° C., and when such elevated temperatures are used in effecting the polymerization with peroxide catalysts, it is desirable to add fresh catalyst from time to time o supply that lost by decomposition. The amount of peroxide catalyst is suitably maintained between about 0.1% and 5%.

In polymerizing the monomeric acetals in the presence of an oxygen-yielding catalyst, the polymerization or chemical binding of monomeric units to form the polymers appears to be affected at least to some extent by oxygen linkages between the monomeric units. On analysis, the polymers have been found to contain a small excess of oxygen over the theoretical, and it appears that this is due to the fact that some of the monomer units of the polymers are linked by oxygen, probably of ethereal nature, rather than being exclusively bound by carbon-to-carbon bonding through the unsaturated polymerizable groups as is the case when heat alone is used to polymerize the compounds.

As was stated hereinabove, the polymerization progresses through several degrees or states. The soluble, fusible modification of the polymer is obtained by interrupting the polymerization before gel formation occurs. The polymerization may be interrupted by numerous expedients such as discontinuing the heating or by destroying the catalyst, for example, by adding a reducing agent to the reaction mixture. Discontinuing the supply of molecular oxygen-containing gas can be used when this material is employed as catalyst.

In preparing the soluble form of the polymer, it is desirable that the polymerization reactions be interrupted before gel formation occurs, and this may be easily accomplished by following the course of the polymerization with observations of the refractive index of the reaction mixture. In general, the polymeric material has a higher refractive index than the monomer and as polymerization proceeds the refractive index of the reaction mixture increases. By observing the refractive index increase with a sample of the acetal which is to be polymerized to just the soluble form, a value can be obtained which will show the point at which polymerization must be interrupted before gel formation occurs.

The reaction mixture obtained in forming the soluble and fusible polymer contains some unreacted monomer. If desired, the monomer can be removed by various methods, but it is preferably done by distillation under reduced pressure. The monomer may also be removed by an extraction procedure, using a substance which is a solvent for the monomer but a non-solvent for the polymer. Suitable materials for this operation include alcohols, e. g. methyl alcohol, ethyl alcohol, the butyl alcohols, hexanols, dodecanols, etc., ethers, e. g. ethyl ether, isopropyl ether, butyl ethers, etc., and aliphatic hydrocarbons, e. g. hexanes, heptanes, octanes, etc. By pouring the crude reaction mixture into one of these materials, the polymer is obtained as a precipitate and the monomer may be removed from the polymer by subjecting the precipitated material to filtration.

The polymer, beta,gamma-olefinic alcohol, i. e. polyallyl alcohol and the like, is obtained in the process of the invention by hydrolysis of the polymeric acetal of the corresponding beta,-gamma-olefinic alcohol. The hydrolysis reaction is effected by heating the polymeric acetal in contact with a dilute aqueous solution of a strong mineral acid. Although the hydrolysis reaction may occur to some slight extent when the polymer is heated with water alone, the reaction is so slow, even at the boiling temperature of water, that the hydrolysis with water alone is not practicable. For this reason a hydrolysis catalyst like a strong mineral acid is used.

In the process of the invention the polymeric acetal is hydrolyzed while removing the aldehyde liberated by the hydrolysis reaction substantially as fast as formed. The removal of the liberated aldehyde from the reaction mixture substantially as fast as formed is of vital importance for successful execution of the process. Owing to the presence of a strong mineral acid in the reaction mixture, the hydrolysis medium is quite strongly acidic. If the aldehyde is allowed to remain in the reaction mixture as liberated, the aldehyde undergoes condensation reactions with itself whereby high molecular weight, aldehyde condensation products are built up therein. For example, when polymeric acetaldehyde diallyl acetal is hydrolyzed, polyallyl alcohol and acetaldehyde are formed. The acetaldehyde liberated by the hydrolysis reaction is subject to chemical condensation if allowed to remain in the acid reaction medium since the strong mineral acid which is a catalyst with a hydrolysis reaction is also a catalyst for condensation reactions. In the presence of acid, the acetaldehyde possibly first forms aldol by chemical condensation or joining of two molecules of aldehyde to form one of aldol. The aldol may chemically dehydrated to give crotonaldehyde. The acetaldehyde further condenses with the aldol or crotonaldehyde to form more complex products. In this manner the aldehyde builds up complex high molecular weight condensation products if the liberated aldehyde is not removed from the hydrolysis mixture as it forms. Such high molecular weight condensation products are resinous in character as is also the desired polymeric alcohol. In order that the polymeric alcohol be obtained in a useful degree of purity, contamination of it with the aldehyde condensation products is highly undesirable since they can be removed from the polymeric alcohol during its purification only with great difficulty or sometimes not completely at all. This contamination of the polymeric alcohol with such aldehyde condensation products is overcome in the process of the invention by removing the liberated aldehyde from the reaction mixture substantially as fast as formed. Consequently, the aldehyde does not have the opportunity to remain in the acid reaction medium for a time sufficient to permit it to undergo condensation.

The liberated aldehyde can be removed from the reaction mixture as fast as formed by several methods. One method is to permit the liberated aldehyde to evaporate from the reaction mixture during the course of the hydrolysis of the polymeric acetal. By heating the reaction mixture, the aldehyde will evaporate therefrom and be removed substantially as fast as formed. If desired, the reaction mixture can be boiled whereby both the rate of hydrolysis and rate of evaporation of the aldehyde are rapid.

A more preferred method of removing the aldehyde is by distillation. The use of distillation has an additional advantage in that the liberated aldehyde is not lost as is the case when evaporation is used. Distillation permits the aldehyde to be recovered. The recovered aldehyde can then be reacted with additional monomeric unsaturated alcohol to form the monomeric acetal which is subjected to polymerization and the polymer is then treated according to the process of the invention. By heating the polymeric acetal in contact with a dilute aqueous solution of a strong mineral acid while distilling the liberated aldehyde from the reaction mixture substantially as fast as formed, there is no appreciable condensation of the liberated aldehyde and the aldehyde is recovered for reuse in the process of the invention.

In order that the hydrolysis reaction will proceed at a rapid rate, a strong mineral acid is present as catalyst. For this purpose strong acids like hydrochloric, hydrobromic, sulfuric and phosphoric acids are used. Hydrochloric acid is particularly preferred since it can easily be removed from the reaction mixture by distillation upon completion of the hydrolysis. This provides a convenient means of freeing the polymeric alcohol of the hydrolysis catalyst.

The concentration of mineral acid used in aqueous solution can be varied over considerable limits although concentrated acid is not employed since it tends to damage and discolor the polymeric alcohol. A concentration of from about 0.1% to 15% acid is suitable although a concentration of from about 1% to 8% is more preferable. The use of an aqueous solution containing in the neighborhood of 5% acid is particularly effective and suitable.

The amount of dilute aqueous solution used in contact with the polymeric acetal can be varied considerably. Although water enters into and is consumed by the hydrolysis reaction, its consumption as a reactant in the process is not very large on a weight basis. For example, polymeric diallyl formal needs only about 14% of its weight as water for complete hydroysis of the polymer. This particular polymer requires the greatest weight of water per weight of polymer for the hydrolysis reaction of any of the polymeric acetals with which the invention is concerned. While the hydrolysis reaction does not consume a large quantity or weight of water, nevertheless the reaction mixture needs to contain a substantial amount of water in effecting the process of the invention. It is preferred to employ about one to four parts by weight of water or aqueous solution, although greater or lesser amounts can be used if desired.

The desired hydrolysis of the polymeric acetal occurs over a wide temperature range. While the hydrolysis reaction occurs at ordinary atmospheric temperature (about 20° C.), the reaction rate at this temperature is too slow for most purposes. Preferably a temperature of from 50° C. to 150° C. is used. The boiling temperature of reaction mixture at atmospheric temperature is convenient for execution of the process. At this temperature the liberated aldehyde readily evaporates from the reaction mixture or readily distils therefrom. In executing the process of the invention wherein the liberated aldehyde forms a constant boiling mixture with water and it is distilled from the reaction mixture, the temperature of the reaction mixture will be only slightly above the boiling point of the azeotrope. Thus, if a polymeric acetal which liberates isobutaldehyde is used, the temperature will be only a little above 60° C. which is the boiling point of the isobutyraldehyde-water azeotrope. This azeotrope splits into two layers upon being condensed and the aqueous layer can be returned to the fractionating column as reflux in the usual fashion. By using suitable superatmospheric pressure in the distillation operation, the temperature of the reaction mixture can be adjudged as high as is desired. Excessively high temperatures at which substantial thermal degradation of the alcohol would occur are, of course, to be avoided. A temperature of about 300° C. seems to be a suitable upper limit.

When the aldehyde liberated from the polymeric acetal forms an azeotrope with water and water is removed as distillate, it is desirable that either the removed water be returned to the reaction mixture or that water be added thereto in order to avoid having the reaction mixture become dehydrated. If the reaction mixture becomes dehydrated, the hydrolysis reaction would, of course, stop since water is a necessary reactant in the hydrolysis reaction.

As explained hereinbefore, the polymeric acetal of the beta,gamma-olefinic alcohol can exist in several degrees or states of polymerization. A fusible polymer of the acetal is preferably employed in the hydrolysis operation, e. g. the soluble and fusible form of polymer or the gel form which is insoluble but fusible. The final state of polymer, which is insoluble and infusible, is the least preferred for subjection to hydrolysis according to the method of the invention.

The hydrolysis of the polymeric acetal frees or reforms the aldehyde. When the monomeric acetal is subjected to polymerization, the polymerization can be interrupted so that the product obtained contains some unpolymerized monomer. This mixture of monomer and polymer can also be hydrolyzed without the necessity of removed unpolymerized monomer. The removal of monomer from the mixture is sometimes troublesome and by subjecting the entire mixture to the hydrolysis treatment the separation of monomer from the mixture is obviated. The products obtained by hydrolyzing a mixture of monomer and polymer will consist of the desired polymeric beta,gamma-olefinic alcohol and the aldehyde as well as free or unpolymerized beta,gamma-olefinic alcohol. The unpolymerized alcohol is obtained by hydrolysis from the monomeric acetal in the mixture. This can be recovered during the hydrolysis and reconverted to monomeric acetal for reuse in the process.

The several forms of the polymeric acetal are substantially insoluble in water and this is true even with the mixture of monomer and polymer. Some of the polymers of lower beta,gamma-olefinic alcohols such as polyallyl alcohol, polymethallyl alcohol, etc., are soluble in water so that the hydrolysis operation on the insoluble polymer has the effect of digesting the polymeric acetal.

Upon completion of the hydrolysis reaction, the hydrolysis catalyst is removed from the reaction mixture. The preferred catalyst, hydrochloric acid, can be removed by evaporation or distillation. In general, the mineral acid catalyst can also be removed by neutralization with an appropriate base which gives an insoluble salt. Reference is made to the use, for example, of barium hydroxide when sulfuric acid is employed as catalyst. Since the hydrolysis catalysts are water-soluble mineral acids, the removal of such acids from the reaction mixture, in which the polymeric alcohol is soluble, can be made by passing the solution through a bed of resin which will combine with and remove the acid such as is described in U. S. Patent No. 2,151,883. The water which remains with the polymeric alcohol is removed therefrom by evaporation or distillation.

The polymeric alcohols produced by the process of the invention are very useful materials. Since the process of the invention permits a polymeric beta-gamma-olefinic alcohol to be obtained which has as many hydroxy groups as there are monomer alcohol units in the polymer molecule, the products have a variety of applications. They are useful in glues, as sizing materials, for textiles and fabrics, as grease-proof impregnants, agents for paper, and the like, as oil lubricating materials, etc. The usefulness of the products as chemical intermediates is extensive. They may be reacted with polycarboxylic acids or anhydrides to form alkyd resins, with unsaturated acids of the drying oil type to form excellent drying oils, with nitric acids to form nitrate explosives, etc.

The following examples are given for the purpose of illustrating the invention in greater detail, it being understood that the particular operative procedures are not to be construed as limitative of the invention. The parts given are by weight in the examples.

Example I

Formaldehyde diallyl acetal was polymerized by heating at about 130° C. while bubbling air through at a rate of about 5 bubbles per second. Observations were made of the refractive index ($n_D^{20}$) at frequent intervals and the increase was observed as follows:

| Hours | Gain in $n_D^{20}$ |
|---|---|
| 13 | 0.0099 |
| 39 | 0.0328 |

The product of polymerization was a very viscous, pale yellow liquid which was soluble in ketones and esters. When this material was added to isopropyl alcohol, diethyl ether or Benzo-Sol solvent (a petroleum naphtha), a white substance was precipitated which was soluble in methyl ethyl ketone and n-butyl acetate.

A mixture of 4 parts of the polymerized product and 20 parts of water was heated on a steam bath. After approximately one-half hour of heating at 100° C., only a slight amount of hydrolysis was evident. A few drops of concentrated hydrochloric acid was added and heating was continued for a period of 8 hours. During the heating, formaldehyde was evaporated from the reaction mixture as it was liberated by the hydrolysis reaction. Some allyl alcohol also evaporated from the reaction mixture, it being formed by hydrolysis of monomeric diallyl formal contained in the polymerization product. The reaction mixture had evaporated to dryness by the end of the heating period.

About 2.5 parts of polyallyl alcohol was obtained. The product was a viscous material which analyzed as follows:

| | Found | (Monomer)$_n$ | Calculated for (Monomer + ½ O$_2$)$_n$ |
|---|---|---|---|
| Percent Carbon | 56(2) | 62.1 | 54.5 |
| Percent Hydrogen | 8(8) | 10.3 | 9.1 |
| Acetyl value equiv./100 g | 1.9 | 1.7 | 1.5 |

The analytical data indicated that some oxygen had combined in forming the polymer.

Example II

Acetaldehyde dimethallyl acetal was polymerized by heating at 125° C. to 130° C. while bubbling air through at a rate of about 5 bubbles per second. Observations were made of the refractive index ($n_D^{20}$) at frequent intervals and the increase obtained is tabulated below:

| Hours | Gain in $n_D^{20}$ |
|---|---|
| 13 | 0.0113 |
| 33 | 0.0242 |
| 52 | 0.0327 |
| 71.5 | 0.0464 |

The polymerization product consisted of a very viscous, yellow mass which was soluble and fusible.

A mixture of 5.5 parts of the polymerized product and 30 parts of water was heated on a steam bath. Hydrolysis took place slowly so about 0.5 part of concentrated hydrochloric acid was added to the reaction mixture. The heating was then continued for about 8 hours during which acetaldehyde was evaporated as formed by the hydrolysis reaction. Some methallyl alcohol and isobutyraldehyde also evaporated from the reaction mixture. At the end of the 8-hour period, the reaction mixture was filtered and evaporated to dryness.

About 2.5 parts of polymethallyl alcohol was obtained in this manner. The product was a viscous material which analyzed as follows:

| | Found | (Monomer) | Calculated for (Monomer + ½ $O_2$) |
|---|---|---|---|
| Percent Carbon | 62.2 | 66.7 | 60.0 |
| Percent Hydrogen | 9.5 | 11.1 | 10.0 |
| Percent Water | 1 | 0 | 0 |
| Acetyl value equiv./100 g | 0.54 | 1.39 | 1.25 |

This analysis indicated that some oxygen had combined in forming the polymer.

This application is a continuation-in-part of our copending application, Serial No. 503,160, filed September 20, 1943.

We claim as our invention:

1. A process for the preparation of a polymeric alcohol which comprises heating polymer of an acetal of a saturated aliphatic monoaldehyde of 1 to 6 carbon atoms and an unsaturated monohydric alcohol having from 3 to 9 carbon atoms with an olefinic bond between the beta and gamma carbon atoms thereof in the presence of a substantial amount of a dilute aqueous solution of a strong mineral acid while removing the aldehyde from the reaction mixture substantially as fast as it is liberated by the hydrolysis reaction.

2. A process for the preparation of polyallyl alcohol which comprises heating polymer of the allyl acetal of a saturated aliphatic monoaldehyde of 1 to 4 carbon atoms in the presence of a substantial amount of a dilute aqueous solution of a strong mineral acid while distilling the aldehyde from the reaction mixture substantially as fast as formed.

3. A process for preparation of the polymeric alcohol which comprises heating polymer of the butyral of an alken-2-ol-1 of 3 to 7 carbon atoms in the presence of a substantial amount of a dilute aqueous solution of a strong mineral acid while distilling the liberated butyraldehyde from the reaction mixture substantially as fast as formed.

4. A process for preparation of the polymeric alcohol which comprises heating polymer of the formal of an alken-2-ol-1 of 3 to 7 carbon atoms in the presence of a substantial amount of a dilute aqueous solution of a strong mineral acid while distilling the liberated formaldehyde from the reaction mixture substantially as fast as formed.

5. A process for production of polyallyl alcohol which comprises heating polymer of the diallyl acetal of a saturated aliphatic monoaldehyde of 1 to 4 carbon atoms in the presence of a substantial amount of dilute solution of a strong mineral acid while distilling the aldehyde from the reaction mixture substantially as fast as formed.

6. A process for the production of polyallyl alcohol which comprises heating polymer of the diallyl acetal of a saturated aliphatic monoaldehyde of 1 to 4 carbon atoms in the presence of a substantial amount of dilute aqueous solution containing 0.1 to 15% hydrochloric acid while distilling the formed aldehyde from the reaction mixture substantially as fast as it is formed by the hydrolysis reaction.

7. A process for production of polymethallyl alcohol which comprises heating polymer of the dimethallyl acetal of a saturated aliphatic monoaldehyde of 1 to 4 carbon atoms in the presence of a substantial amount of dilute solution of a strong mineral acid while distilling the aldehyde from the reaction mixture substantially as fast as formed.

8. A process for the production of polyallyl alcohol which comprises heating 1 part of polymer of diallyl formal in contact with 1 to 4 parts of 1 to 5% aqueous hydrochloric acid while distilling the formaldehyde from the reaction mixture substantially as fast as formed.

9. A process for the production of polyallyl alcohol which comprises heating 1 part of polymer of diallyl butyral in contact with 1 to 4 parts of 1 to 5% aqueous hydrochloric acid while distilling the butyraldehyde from the reaction mixture substantially as fast as formed.

DAVID E. ADELSON.
HAROLD F. GRAY, Jr.

No references cited.